(12) United States Patent
Cimpoi et al.

(10) Patent No.: US 8,594,422 B2
(45) Date of Patent: Nov. 26, 2013

(54) PAGE LAYOUT DETERMINATION OF AN IMAGE UNDERGOING OPTICAL CHARACTER RECOGNITION

(75) Inventors: Mircea Cimpoi, Belgrade (RS); Sasa Galic, Seattle, WA (US); Milan Vugdelija, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 12/721,949

(22) Filed: Mar. 11, 2010

(65) Prior Publication Data

US 2011/0222771 A1  Sep. 15, 2011

(51) Int. Cl.
*G06K 9/00* (2006.01)
(52) U.S. Cl.
USPC .......................................................... 382/170
(58) Field of Classification Search
None
See application file for complete search history.

(56) References Cited

U.S. PATENT DOCUMENTS

| | | | |
|---|---|---|---|
| 6,108,444 A | 8/2000 | Syeda-Mahmood | |
| 6,115,497 A | 9/2000 | Vaezi et al. | |
| 7,792,362 B2 * | 9/2010 | Berkner et al. | 382/176 |
| 2006/0120629 A1 | 6/2006 | Myers et al. | |
| 2008/0002893 A1 | 1/2008 | Vincent et al. | |
| 2008/0008386 A1 | 1/2008 | Anisimovich et al. | |

FOREIGN PATENT DOCUMENTS

| | | |
|---|---|---|
| JP | 05-159062 | 6/1993 |
| JP | 2005-250816 | 9/2005 |
| JP | 2009-230605 | 10/2009 |

OTHER PUBLICATIONS

International Search Report from corresponding application No. PCT/US2011/027779, dated Oct. 31, 2011, 8 pages.
Louloudis, et al., "Text Line Detection in Handwritten Documents", Retrieved at<<http://users.iit.demokritos.gr/~bgat/Louloud2008.pdf>>, Pattern Recognition, vol. 41, Issue 12, 2008, pp. 3758-3772.
Author Unknown, "Partial Eight Direction Based Line Segmentation Algorithm for Epigraphical Script Images", Retrieved at<<http://www.thefreelibrary.com/Partial+Eight+Direction+Based+Line+Segmentation+Algorithm+for...-a01073993452>>, Oct. 3, 2009, pp. 5.
Malerba, et al., "Machine Learning for Reading Order Detection in Document Image Understanding", Retrieved at<<http://www.di.uniba.it/~malerba/publications/LDAR.pdf>>, Dec. 27, 2007, pp. 25.
Faure, Claudie, "Preattentive Reading and Selective Attention for Document Image Analysis", Retrieved at<<http://www.tsi.enst.fr/~cfaure/articles/icdar99.pdf>>, Sep. 20, 1999, pp. 4.

* cited by examiner

*Primary Examiner* — Vikkram Bali
(74) *Attorney, Agent, or Firm* — L. Alan Collins; Collins & Collins Intellectual, LLC

(57) ABSTRACT

A method and system is provided for identifying a page layout of an image that includes textual regions. The textual regions are to undergo optical character recognition (OCR). The system includes an input component that receives an input image that includes words around which bounding boxes have been formed and a text identifying component that groups the words into a plurality of text regions. A reading line component groups words within each of the text regions into reading lines. A text region sorting component that sorts the text regions in accordance with their reading order.

18 Claims, 9 Drawing Sheets

*(Text and image regions labeled according to reading order)*

*(Text regions labeled according to reading order)*

*(Multiple Column Page)*

*(Multiple column page; columns inside text column)*

*(Tight columns; word spacing resulting in false positive white space candidates)*

(Image inside text column)

(Image inside text column)

(Text wrapping around the image)

*(Floating text region)*

(Coordinates of a Rectangle on the Page)

(Whitespace rectangle between two word bounding boxes)

(Expanding whitespace over images)

FIG. 15
*(Expanding (vertically) and shrinking (horizontally))*

(One step in breaking a page into text regions, using whitespace information)

(Second method for computing the text regions)

*(Page Layout Susceptible to misinterpretation)*

PAGE LAYOUT DETERMINATION OF AN IMAGE UNDERGOING OPTICAL CHARACTER RECOGNITION

BACKGROUND

Optical character recognition (OCR) is a computer-based translation of an image of text into digital form as machine-editable text, generally in a standard encoding scheme. This process eliminates the need to manually type the document into the computer system. An OCR process typically begins by obtaining an electronic file of a physical document bearing the printed text message and scanning the document with a device such as an optical scanner. Such devices produce an electronic image of the original document. The output image is then supplied to a computer or other processing device and processes the image of the scanned document to differentiate between images and text and determine what letters are represented in the light and dark areas.

SUMMARY

Documents containing text may be arranged on a page with many different types of layouts. For instance, text may be arranged in multiple columns and images may be interspersed between different regions of text or even within a text column. In order to accurately perform the OCR process and retain the original page layout, it is important to determine this layout and the reading order of the text within that layout when the document is undergoing OCR.

In one implementation, a method is provided for identifying a page layout of an image that includes textual regions. The method begins by receiving an input image that includes words around which bounding boxes have been formed. The words are grouped into a plurality of text regions. The words within each of the text regions are then grouped into reading lines. The text regions are sorted in accordance with their reading order.

In one particular implementation, the words are grouped into a plurality of text regions by first identifying one or more white space regions which are located between the text regions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 15 shows the process of expanding and shrinking the white space rectangles.

DETAILED DESCRIPTION

Figure 1:
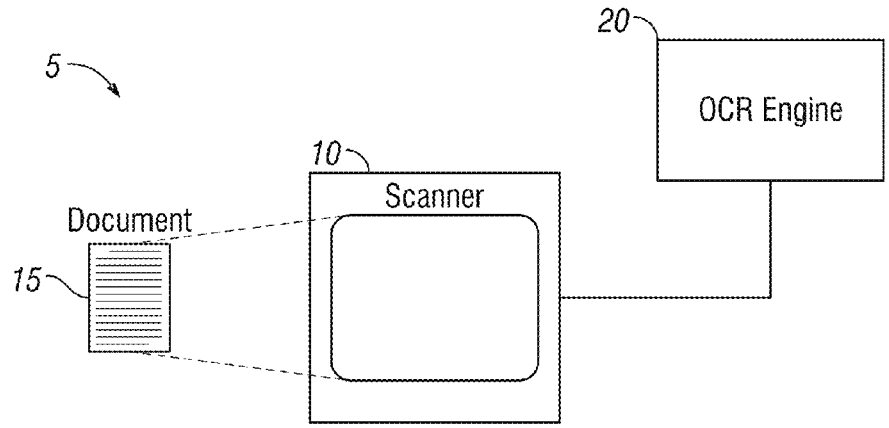
FIG. 1 shows one illustrative example of a system for optical character recognition.

FIG. 1 shows one illustrative example of a system 5 for optical character recognition (OCR) which includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The accuracy of an OCR process can be significantly improved if the correct page layout (e.g., the geometry of text regions and lines within text regions) and the reading order of the document can be determined. In addition to overall recognition accuracy, the successful detection of these layout elements has a significant impact on retention of the original layout in the resulting output document. As detailed below, a method is presented for correctly determining the reading order of text regions and the grouping of words into text regions.

Figure 2:
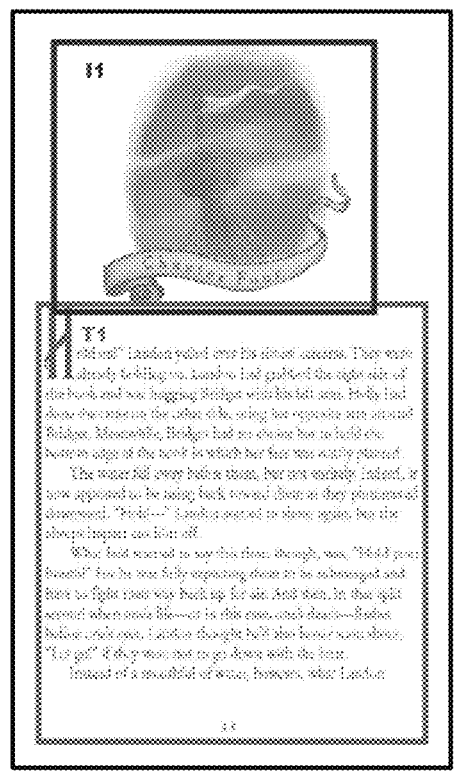
FIGS. 2 and 3 show examples of text regions on a page, denoted according to the reading order as text regions T1 and T2.
Figure 3:
Figure 4:
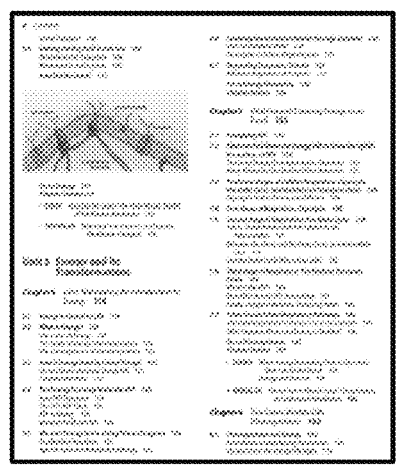
FIGS. 4-10 show illustrative examples of page layouts that may be determined by the methods, techniques and systems described herein.
Figure 5:
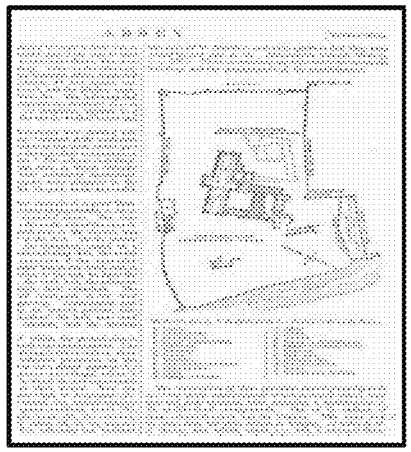
Figure 6:
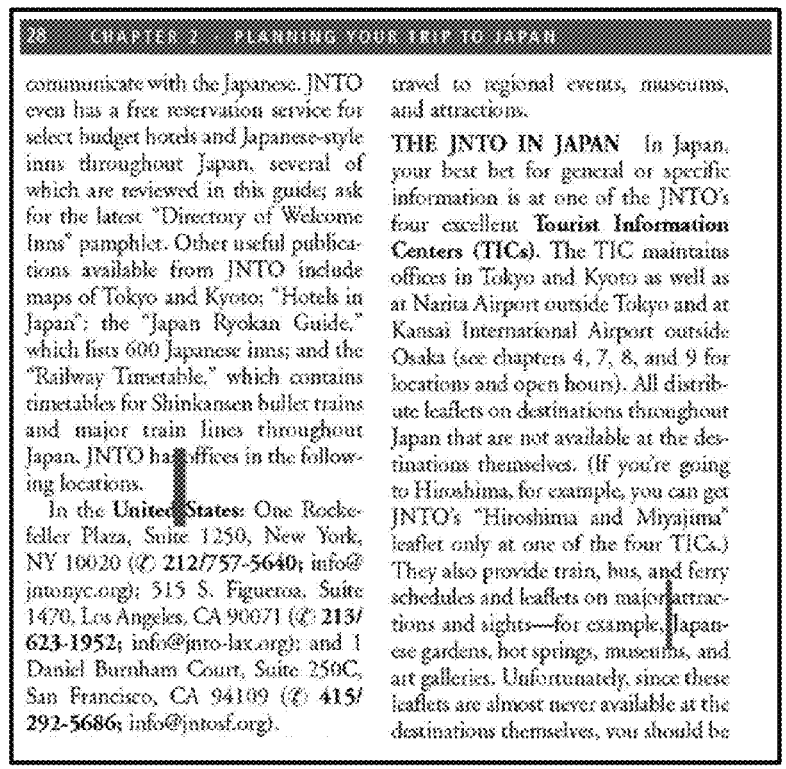
Figure 7:
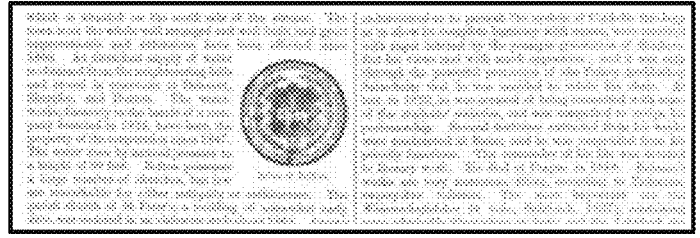
Figure 8:
Figure 9:
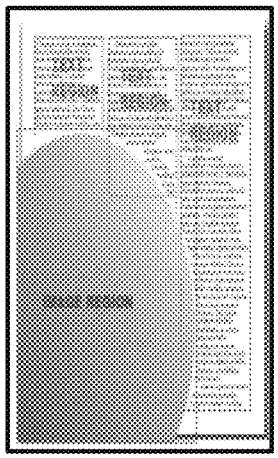
Figure 10:
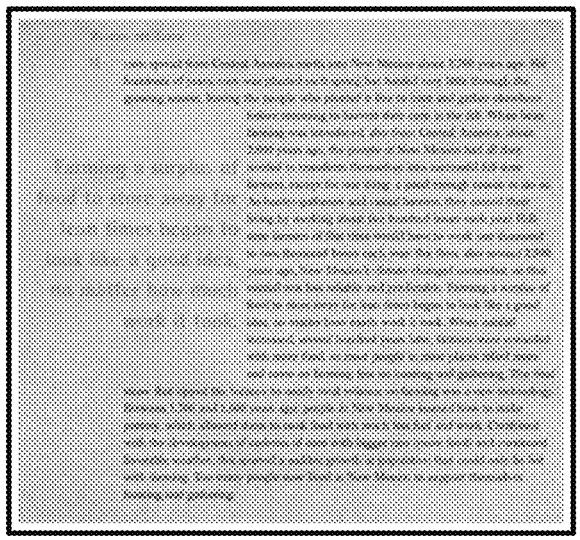

A text region may be roughly defined as the maximum area, typically a rectangle, that contains all word bounding boxes that can be grouped in textual lines, which, when sorted based on their vertical position, reflect the reading order in the aforementioned rectangle. The reading order in a document is given by the order of the text regions, and by the order of lines inside each text region. FIGS. 2 and 3 show examples of text regions on a page, denoted according to the reading order as text regions T1 and T2. The document in FIG. 2 also includes a non-textual image I1.

A white space rectangle may be defined as the maximal inter-word rectangle which does not intersect any word bounding box, which is a rectangle determining the portion of the image that contains the given word.

The process described below groups words into lines based on their bounding boxes. More specifically, words are grouped into lines based on the distance between them, their relative vertical position and the height of their bounding box. The lines are then grouped into text regions, and the reading order within a given region is determined by the vertical order of the lines. The reading order of the document is given by the sequence of text regions which corresponds to the natural flow of text.

The process can be applied to page layouts that are both simple and complex. Examples of such page layouts are shown in FIGS. 4-10.

Figure 11:
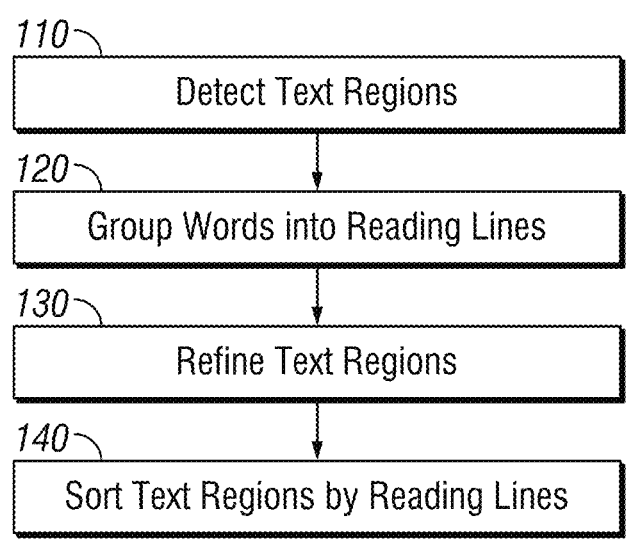
FIG. 11 is a flowchart showing one example of a method for identifying a page layout of an image that includes textual regions.

This process can be summarized by the sequence of steps illustrated in the flowchart shown in FIG. 11. First, in step 110, the text regions are detected. Within each text region words are grouped into reading lines in step 120. The text regions are refined in step 130 and sorted according to reading order in step 140.

Text Region Detection

Text detection is based on the spacing between words. It takes advantage of the fact that in general inter-column spacings are wider than inter-word spacings and that the text regions exhibit some regularities, such as alignment, for example. In order to detect the text regions on a document, the white space rectangles are first computed, which will form the inter-region spaces.

Figure 12:
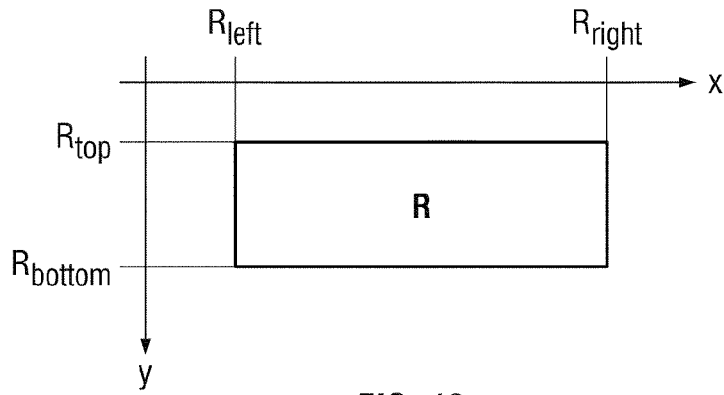
FIG. 12 shows the coordinate system that is used to define a rectangle (either a white space rectangle or a text rectangle) on a document.

The coordinates that will be used to define a rectangle (either a white space rectangle or a text rectangle) on a document are shown in FIG. 12. The origin will be assumed to be located at the top right edge of the document. Of course, these coordinates are used for purposes of illustration. In general, any suitable coordinate system may be employed.

Figure 13:
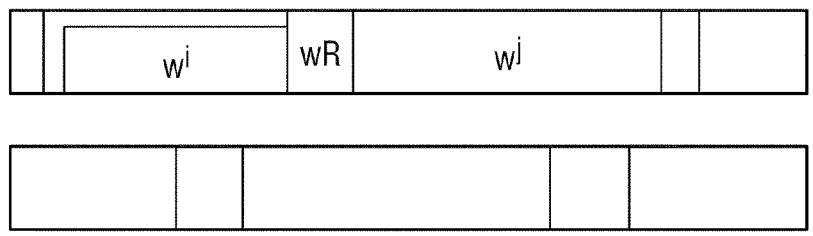
FIG. 13 shows an example of such a whitepace candidate seed.

The process of computing white space rectangles begins by selecting white space seeds, which are candidate interspace regions. To qualify as a seed, an inter-word space has to have a width greater than some threshold while also being able to be expanded in height. Seeds are identified by sorting words (from left-right and top-bottom). Then, a whitespace candidate seed is built between two word bounding boxes, $w^i$ and $w^j$, whose vertical projections overlap:

$$\text{whiteRect}_{left} = \min(w_{right}^i, w_{right}^j)$$

$$\text{whiteRect}_{right} = \max(w_{left}^i, w_{right}^j)$$

$$\text{whiteRect}_{top} = \min(w_{top}^i, w_{top}^j) \quad \text{whiteRect}_{bottom} = \max(w_{bottom}^i, w_{bottom}^j)$$

Where $w_{right}^i$ is the coordinate of the rightmost border of word bounding box i. The other borders of the bounding boxes are defined in a similar manner. An example of such a whitepace candidate seed wR is shown in FIG. 13.

Finally, after they have been determined, whitespace candidates seeds that overlap with word bounding boxes are removed.

An alternate way of computing the whitespace candidate seeds is to find, for each word bounding box, the nearest neighbor bounding box to its right (which is also vertically overlapping) and compute the white space as the space between these two words. The resulting whitespace rectangle is guaranteed not to intersect any other word bounding box, since it has been chosen as the space between one word bounding box and the nearest word bounding box to the right.

Once a set of whitespace candidate seeds is obtained, each one is expanded vertically upwards and downwards by a configurable amount. That is, the coordinates of the top and bottom borders of each candidate seed are changed as follows:

$$\text{whiteRect}_{top} = \text{whiteRect}_{top} - \alpha \cdot \overline{\text{height}} \text{ (here}$$

$$\text{whiteRect}_{bottom} = \text{whiteRect}_{bottom} + \alpha \cdot \overline{\text{height}}$$

Where $\alpha$ is a configurable constant and $\overline{\text{height}}$ is the average word bounding box height, which has been precomputed as a page property.

The expanded whitespace candidate seeds are filtered, and only those that do not intersect any word bounding boxes are kept as white space seeds. These white space seeds then undergo another expansion process.

Figure 14:
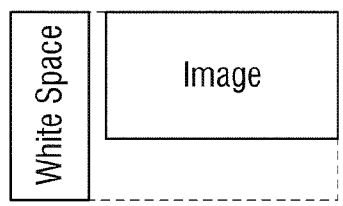
FIG. 14 illustrates the process of merging white space seeds by expanding a seed to cover the image to its right.

First, whitespace seeds are merged if they have any overlapping areas. Next, the seeds are expanded horizontally to cover any images, provided that the resulting rectangular seed does not also overlap any word bounding boxes. As an example, FIG. 14 shows a white space seed that can be expanded to cover the image to its right.

The resulting whitespace rectangles are once again vertically expanded upwards and downwards, while also shrinking them horizontally if they overlap with any word bounding boxes. This expansion and shrinking process continues until the resulting whitespace rectangle has a width that falls below some configurable threshold. In addition, if two whitespace rectangles start intersecting one another as a result of the expansion process they are merged together.

The vertical expansion and horizontal shrinking of the whitespace rectangles (if needed), proceed in accordance with the following formulas:

Shrink:

$$\text{rect}_{left} = \max(wb_{right}^i), wb^i \text{ overlaps vertically with rect,} \\ \text{and } wb_{right}^i < \text{rect}_{right}$$

$$\text{rect}_{right} = \min(wb_{left}^i), wb^i \text{ overlaps vertically with rect,} \\ \text{and } wb_{left}^i < \text{rect}_{left}$$

Expand:

$$\text{rect}_{top} = \max(wb_{bottom}^i), wb^i \text{ overlaps horizontally with} \\ \text{rect, and } wb_{bottom}^i < \text{rect}_{top}$$

$$\text{rect}_{bottom} = \min(wb_{top}^i), wb^i \text{ overlaps horizontally with} \\ \text{rect, and } wb_{top}^i > \text{rect}_{bottom}$$

Where $wb^i$ represents the word bounding boxes and rect is the whitespace rectangle being expanded.

If there are no word bounding boxes horizontally overlapping (above or below) with the white space rectangle, the rectangle is expanded up to the minimum word bounding box top and the maximum word bounding box bottom, which may be precomputed as page statistics. The rectangles are expanded, if the resulting rectangle is wider than some threshold, which also may be expressed as a function of precomputed page statistics. If expanding one rectangle would result in a rectangle which is not sufficiently wide, the expansion is cancelled, and the rectangle is kept with its coordinates prior to the expansion.

Figure 15:
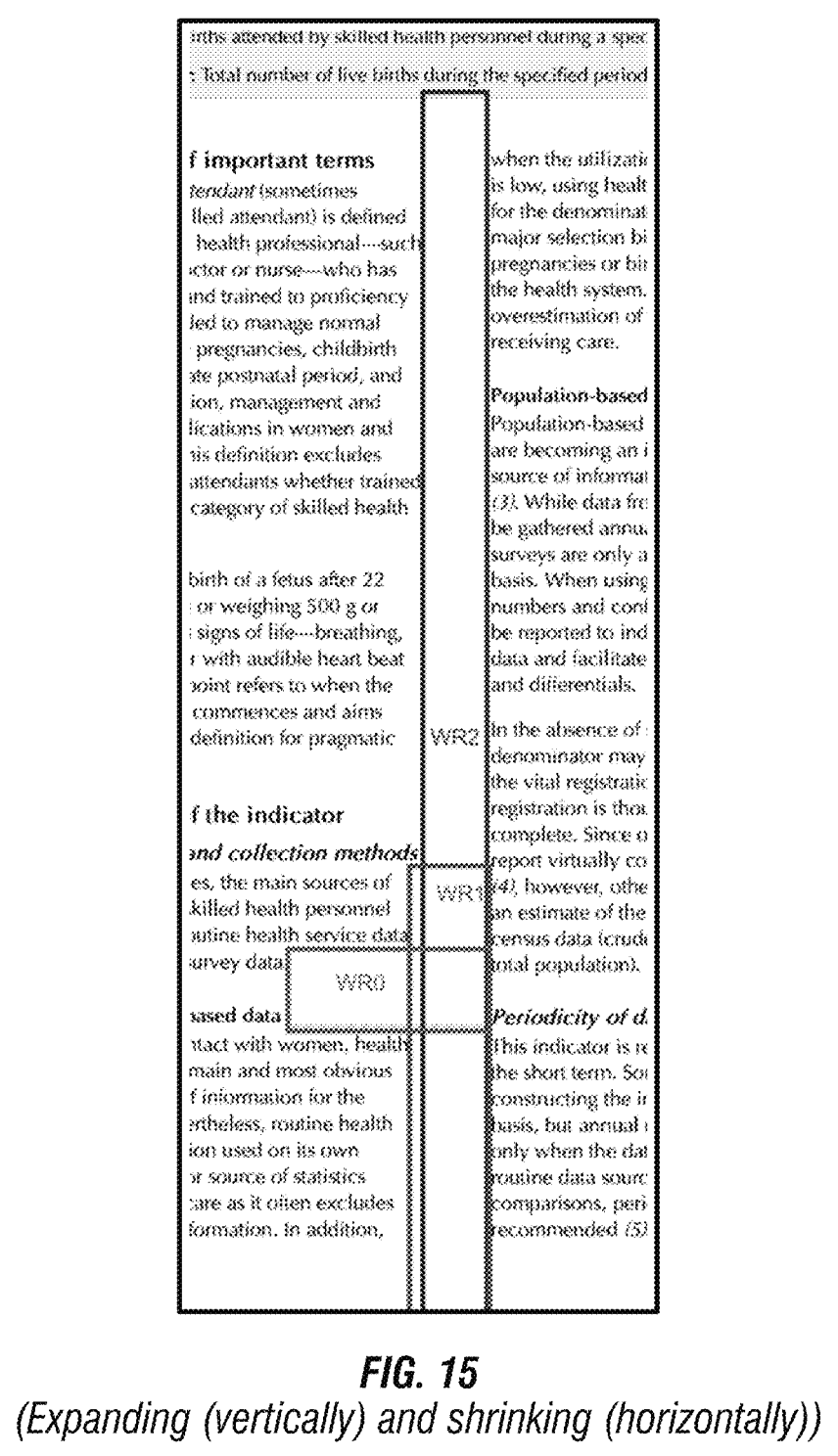

The process of expanding and shrinking the white space rectangles is illustrated in FIG. 15. Starting with the whitespace rectangle WR0, which overlaps some word bounding boxes, it is shrunk so that it can be further expanded vertically until it overlaps with another word bounding box. The resulting rectangle is denoted WR1. Then, since it is possible to shrink the rectangle once again, it is further expanded from WR1 to WR2. After this step, WR2 cannot be vertically expanded upward anymore (since its width would fall below some threshold value, relative to the average word height). As a consequence, the coordinate of the top border of WR2 will be chosen to be equal to the value of the coordinate of the bottom border of the word bounding box immediately above it (which in the example of FIG. 15 is the word "during").

Any resulting white space rectangles that overlap are once again merged until there are no more overlapping white space rectangles. The remaining white space rectangles are reduced so that their top borders match the top of the topmost word bounding box with which they vertically overlap. Likewise, the bottom borders of the whitespace rectangles are reduced so that they match the bottom of the bottommost word bounding boxes with which they vertically overlap.

Next, the whitespace rectangles are ranked in such a way that reflects the likelihood that they actually correspond to inter-region spaces between different text regions. Only those whitespace rectangles that receive a ranking or score above a threshold value will be maintained as inter-space regions. For each rectangle, two values are computed. One value is computed as the number of word bounding boxes that vertically overlap with the whitespace rectangle, positioned to the right of the whitespace rectangle, and which are closer than some threshold to the whitespace rectangle.

The other value is computed as the number of word bounding boxes vertically overlapping with the whitespace rectangle, positioned to the left of the whitespace rectangle, and which are closer than some threshold to the whitespace rectangle. In addition, however, this value only includes word bounding boxes that are wider than some minimum width, thereby eliminating from the value such items as bullets, list numbers and the like. The ranking or score of a white space rectangle is computed as the sum of its right and left values.

The whitespace rectangles are filtered by their score or ranking. In the case of overlapping rectangles with equal scores, the wider whitespace rectangle will be retained. The final set of whitespace rectangles is once again filtered by score so that only the higher ranked rectangles (expressed as a percentage of all the rectangles or as a numerical score) are retained.

Once the white space rectangles have been determined in the manner described above, the text regions can be determined in one of two ways that will be described below.

Figure 16:
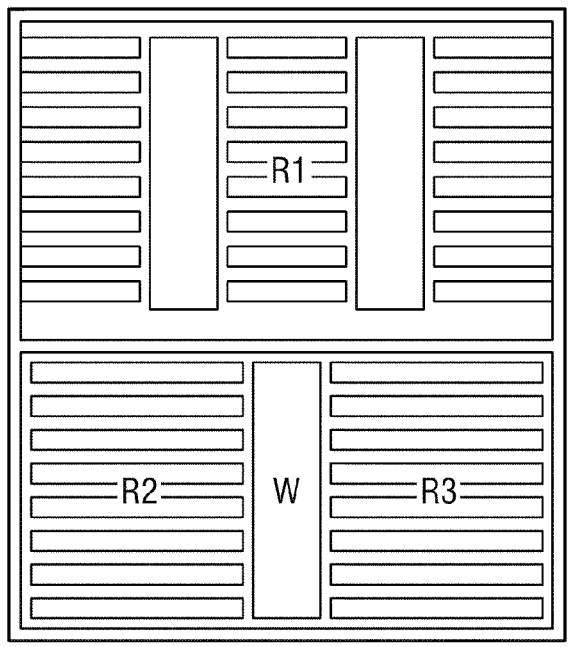
FIG. 16 is an example of a page layout used to illustrate one method for identifying text regions.

The first method to identify text regions will be described in connection with the example in FIG. 16. The method begins by selecting the entire page as a candidate text region. Next, the candidate text region is examined to see if it contains any white space rectangles. If not, then the entire page represents a single text region. Alternatively, if the candidate text region contains one or more whitespace rectangles (three are present in FIG. 16), the largest of them is selected. The candidate text region is then sliced into separate text regions located above and below and to the left and right of the selected whitespace rectangle In FIG. 16, the whitespace rectangle W is selected and the candidate text region (i.e. the full page) is divided into separate text regions R2 and R3, which are to the left and right, respectively, of whitespace rectangle W. It is also divided into text region R1 located above the whitespace rectangle W. In this example there is no text region below the whitespace rectangle W. Once again, each of the candidate text regions R1, R2 and R3 are examined to determine if they contain any whitespace rectangles. If not, then the candidate text region is identified as an actual text region. This is the case for text regions R2 and R3 in FIG. 16. If the candidate text region does contain one or more whitespace rectangles, the largest one is selected and the text region in which it is located is once again sliced in the manner described above. In the example of FIG. 16 the text region R1 contains two whitespace rectangles. This process continues until all the text regions which do not contain any whitespace regions have been identified.

Figure 17:
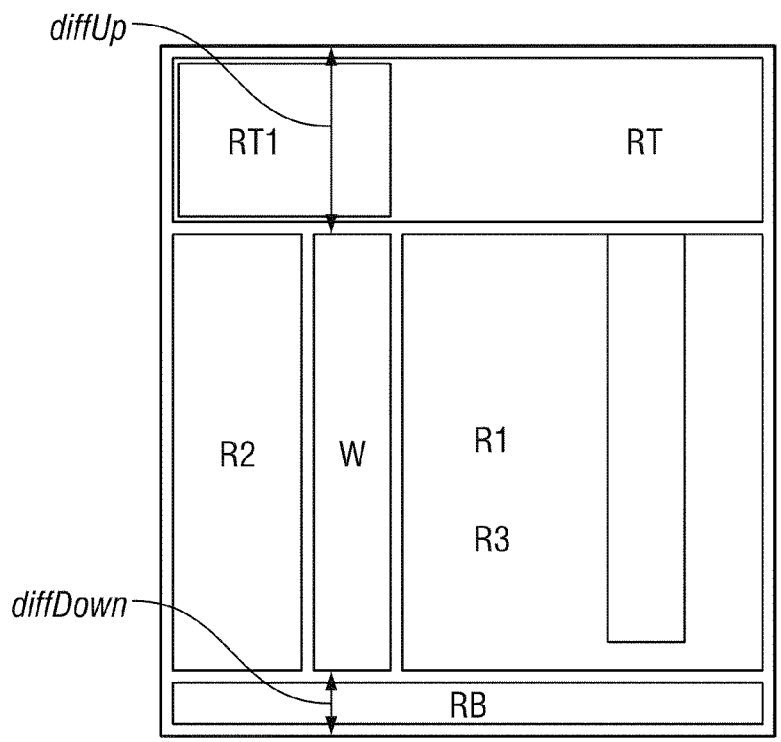
FIG. 17 is an example of a page layout used to illustrate another method for identifying text regions.

The second method to identify text regions can be described by the following algorithm, which is illustrated in connection with the example in FIG. 17.

First, all the whitespace rectangles are sorted by their left coordinate.

An initial region R is then defined, which is bounded by the page margins P{Pleft, Ptop, Pright, Pbottom}.

Next, the region R is added to a temporary region set T and the temporary region count is set to 1.

For each temporary region R1;
   If R1 intersects a whitespace rectangle W, the excess regions above and below it are computed as follows:
      diffUp = max(0,R1$_{top}$ − W$_{top}$)
      diffDown = max(0,R1$_{bottom}$ − W$_{bottom}$)

-continued

If (diffUp > 0)
      Add RT{R1left,R1top, R1right, Wtop} to T;
   If (diffDown > 0)
      Add RB{R1left,Wbottom, R1right, R1bottom} to T;
   Add R2 {R1left,R1top,Wleft, R1bottom} to the finished regions set, F;
   Add R3{Wright, Wtop, Pright, Wbottom} to the set of temporary regions; this will be a region to the right of the white space rectangle, to continue building final text regions to the right;
   Let RT1 be: {RTleft, RTtop, Wright, Wtop},
   If RT1 does not contain any word bounding boxes, R2 is expanded to the top, and RT is reduced to the right of W;
  End for each temporary region;
End for each whitespace rectangle.

Finally, this second method of identifying text regions ends by attempting to merge text regions which are adjacent (R2top=R1bottom) and are aligned on the left coordinate (R1left=R2left).

Group Words into Reading Lines

After the set of text regions have been identified, the reading lines within each text region are created. This is accomplished by first grouping the words into three categories based on their height relative to an average height of the words in the text region. Line height is computed as the difference between the maximum of the bottom coordinates of the word bounding boxes and the minimum of their top coordinates. Next, the words assigned to the average category are arranged into a set of reading lines. If any particular word does not vertically overlap with any other line, a reading line is created which only contains this word. After the reading lines have been created, the words assigned to the small category are added to the existing reading lines (The small category generally includes items such as punctuation, footnote marks, etc). Finally, the words assigned to the tall category are added to existing set of reading lines. If the order were reversed so that tall words were first used to create the reading lines, overlapping merged lines would likely be created.

Refinement of Text Regions

After the reading lines have been established, various post processing may be performed. For instance, the text regions may be refined to improve reading order and to correct the order of the lines in some special situations. This may be accomplished by merging broken regions, which are regions that overlap horizontally, have a small distance between them, and when merged, yield a rectangle that does not overlap other text regions. The merged region will be bounded by the smallest rectangle that contains the regions being merged.

Figure 18:
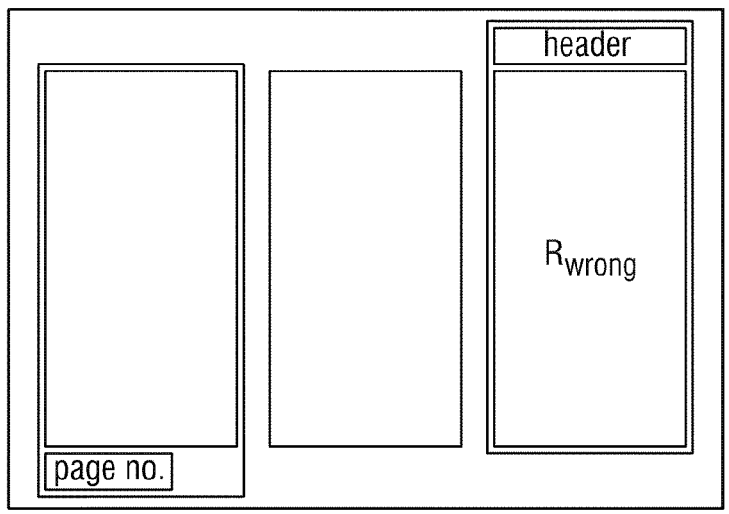
FIG. 18 shows an example of a page layout having multiple columns and headers and footers.

Another post-processing step may be performed for pages with multiple columns if they include headers or footers having a width less than the column width or if they have gaps matching the inter column space. FIG. 18 shows an example of such a page layout. In this situation one additional step may be performed to break the first line of a text region if the first line appears to have different features compared to the statistics (e.g., text height, inter-line spacing) for the text region The page layout shown in FIG. 18 represents a common example in which the reading order may be miscomputed as a result of merging the header and the page number with the other text regions. In this example, features such as the median of the line interspace within the text region and the height and character stroke width may be used to determine whether to break the first and/or last line or lines from the remainder of the text region.

Sorting of Text Regions into Reading Order

Finally, the text regions which have been identified and refined, if necessary, are sorted using a simple, but effective ordering rule. Given two text regions R1, R2:

$$\text{compare}(R_1, R_2) = \begin{cases} \text{sgn}(R_{1\ left} - R_{2\ left}), & \text{if } R_1 \text{ and } R_2 \text{ overlap vertically} \\ \text{sgn}(R_{1\ top} - R_{2\ top}), & \text{otherwise} \end{cases}$$

where the sgn function is the standard sign function, defined as follows:

$$\text{sgn}(x) = \begin{cases} -1, & \text{if } x < 0 \\ 1, & \text{if } x > 0 \\ 0, & \text{if } x = 0. \end{cases}$$

Assuming the origin of the coordinate system is the upper left corner of the page, this comparison step returns 0 if the regions are identical, −1 if R1 should be appear before R2 in the reading order, and 1 otherwise.

In other words, the left-most borders of text regions which vertically overlap with one another are compared. The regions are then assigned a reading order such that a text region with a left-most border closer to a left edge of the page is assigned an earlier place in the reading order than a text region with a left-most border more distant from the left edge of the page. In addition, the top-most borders of text regions that do not vertically overlap with one another are compared. A reading order is assigned to these text regions such that a text region with a top-most border closer to a top edge of the page is assigned an earlier place in the reading order than a text region with a top-most border more distant from the top edge of the page.

Because of the manner in which the text regions have been determined, the reading lines inside each text region are already sorted according to the reading order (from top to bottom).

Figure 19:
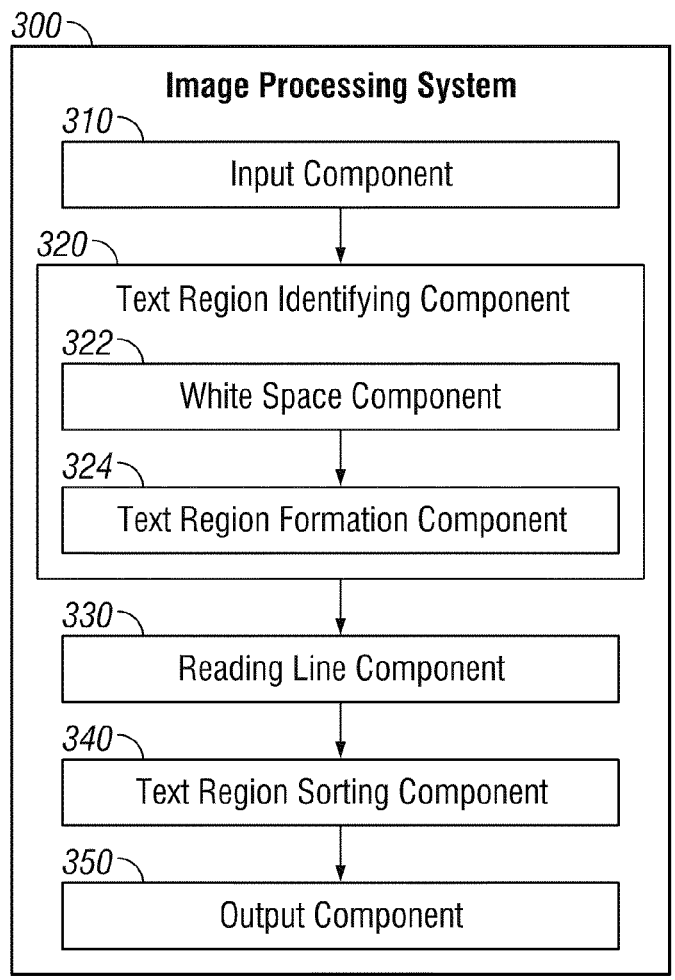
FIG. 19 shows one example of an image processing system that may perform a method for identifying a page layout of an image that includes textual regions.

FIG. 19 shows one example of an image processing system 300 that may perform the method for identifying a page layout of an image that includes textual regions. The system 300 includes an input component 310 that receives an input image that includes words around which bounding boxes have been formed. A text identifying component 320 groups the words into a plurality of text regions. The text identifying component includes a white space component 322 for determining the white space rectangles and a text region formation component 324 for forming the text regions using the white space rectangles in the manner described above. The system 300 also includes a reading line component 330 that groups words within each of the text regions into reading lines and a text region sorting component 340 that sorts the text regions in accordance with their reading order.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for identifying a page layout of an image that includes textual regions, comprising:
   receiving an input image that includes words around which bounding boxes have been formed;
   grouping the words into a plurality of text regions;
   grouping words within each of the text regions into reading lines, this grouping comprising:
      grouping the words into three categories based on their height relative to an average height of the words in the text region such that each word is assigned to a small, average or tall category,
      arranging words assigned to the average category into a first set of reading lines,
      arranging words assigned to the small category into the first set of reading lines, and
      arranging words assigned to the tall category into the first set of reading lines after the words assigned to the small category have been arranged into the first set of reading lines; and
   sorting the text regions in accordance with their reading order.

2. The method of claim 1 wherein grouping the words into a plurality of text regions further comprises identifying one or more white space regions located between the text regions.

3. The method of claim 2 wherein identifying the white space regions includes:
   selecting one or more rectangular white space candidate seeds that are candidate white space regions, said white space candidate seeds being located in inter-word spaces between neighboring, vertically overlapping word bounding boxes and having a width greater than a threshold width;
   vertically expanding each white space candidate seed by a configurable amount;
   selecting expanded white space candidate seeds that do not intersect any word bounding boxes as white space seeds;
   horizontally expanding the white space seeds without overlapping any word bounding boxes; and
   vertically expanding the horizontally expanded white space seeds while horizontally shrinking any vertically and horizontally expanded white space seeds to prevent overlap with any word bounding boxes.

4. The method of claim 3 further comprising merging at least white space seeds that overlap one another into a single white space seed.

5. The method of claim 3 wherein horizontally expanding the white space seeds includes horizontally expanding the white space seeds to cover one or more images.

6. The method of claim 3 wherein horizontally shrinking the vertically and horizontally expanded white space seeds terminate when the width falls below the threshold width.

7. The method of claim 3 further comprising:
assigning a score to each white space seed based on a number of word bounding boxes vertically overlapping each respective white space seed which are also within a predefined distance of that respective white space seed;
filtering the white space seeds so that only those having a score greater than a predefined threshold are retained as white space regions.

8. The method of claim 7 wherein the number of word bounding boxes vertically overlapping each respective white space seed which are also within a predefined distance of that respective white space seed includes vertically overlapping word bounding boxes located left and right of the respective white seed, wherein the word bounding boxes to the left of the respective white space seed which are included in the score are only those having a width greater than a predefined value.

9. The method of claim 1 wherein sorting the text regions in accordance with their reading order further comprises:
comparing left-most borders of text regions that vertically overlap with one another and assigning a reading order to the vertically overlapping text regions such that a text region with a left-most border closer to a left page edge is assigned an earlier place in the reading order than a text region with a left-most border more distant from the left page edge; and
comparing top-most borders of text regions that do not vertically overlap with one another and assigning a reading order to the text regions that do not vertically overlap such that a text region with a top-most border closer to a top page edge is assigned an earlier place in the reading order than a text region with a top-most border more distant from the top page edge.

10. The method of claim 2 wherein grouping the words into a plurality of text regions further comprises:
selecting as candidate text regions any regions located left, right, above or below at least one of the white space regions; and
determining if any of the candidate text regions contain one of the white space regions and, if so, further dividing those candidate text regions until a set of regions are identified that do not contain any of the white space regions, each region in the set of regions being one of the text regions.

11. The method of claim 2 wherein grouping the words into a plurality of text regions further comprises:
selecting a candidate text region and determining if any of the white space regions are contained therein;
slicing any candidate text regions that contain one or more first white space regions into separate candidate text regions located above and below a largest of the first white space regions contained therein as well as into separate candidate text regions located left and right of the largest first white space region; and
slicing any of the separate candidate text regions that contain one or more second white space regions into additional candidate text regions located above and below a largest of the second white space regions contained therein as well as into separate additional candidate text regions located left and right of the largest second white space region; and
identifying any of the candidate text regions that do not contain any white space regions as the text regions.

12. A system comprising a memory, the system for identifying a page layout of an image that includes textual regions, comprising:
an input component configured for receiving an input image that includes words around which bounding boxes have been formed;
a text identifying component configured for grouping the words into a plurality of text regions;
a reading line component configured for grouping words within each of the text regions into reading lines, this grouping comprising:
grouping the words into three categories based on their height relative to an average height of the words in the text region such that each word is assigned to a small, average or tall category,
arranging words assigned to the average category into a first set of reading lines,
arranging words assigned to the small category into the first set of reading lines, and
arranging words assigned to the tall category into the first set of reading lines after the words assigned to the small category have been arranged into the first set of reading lines; and
a text region sorting component configured for sorting the text regions in accordance with their reading order.

13. The system of claim 12 wherein the text identifying component identifies one or more white space regions located between the text regions.

14. The system of claim 13 wherein the text identifying component identifies the white space regions by:
selecting one or more rectangular white space candidate seeds that are candidate white space regions, said white space candidate seeds being located in inter-word spaces between neighboring, vertically overlapping word bounding boxes and having a width greater than a threshold width;
vertically expanding each white space candidate seed by a configurable amount;
selecting expanded white space candidate seeds that do not intersect any word bounding boxes as white space seeds;
horizontally expanding the white space seeds without overlapping any word bounding boxes; and
vertically expanding the horizontally expanded white space seeds while horizontally shrinking any vertically and horizontally expanded white space seeds to prevent overlap with any word bounding boxes.

15. The system of claim 14 wherein the text identifying component merges at least white space seeds that overlap one another into a single white space seed.

16. The system of claim 15 wherein the text identifying component horizontally expands the white space seeds by horizontally expanding the white space seeds to cover one or more images.

17. The system of claim 14 wherein the text identifying component (i) assigns a score to each white space seed based on a number of word bounding boxes vertically overlapping each respective white space seed which are also within a predefined distance of that respective white space seed and (ii) filters the white space seeds so that only those having a score greater than a predefined threshold are retained as white space regions.

18. The system of claim 14 wherein the text identifying component groups the words into a plurality of text regions by (i) selecting as candidate text regions any regions located left, right, above or below at least one of the white space regions; and (ii) determining if any of the candidate text regions contain one of the white space regions and, if so, further dividing those candidate text regions until a set of regions are identified that do not contain any of the white space regions, each region in the set of regions being one of the text regions.

* * * * *